(12) United States Patent
Marupaduga et al.

(10) Patent No.: US 9,887,746 B1
(45) Date of Patent: Feb. 6, 2018

(54) OPTIMIZING LTE TRANSMIT DIVERSITY IMPLEMENTATION BASED ON WIRELESS DEVICE TRANSMIT POWER AND POWER HEADROOM

(71) Applicant: Sprint Spectrum LP, Overland Park, KS (US)

(72) Inventors: Sreekar Marupaduga, Overland Park, KS (US); Patrick Himmelberg, Overland Park, KS (US); Clark Halferty, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/435,505

(22) Filed: Feb. 17, 2017

(51) Int. Cl.
*H04B 7/0426* (2017.01)
*H04W 52/36* (2009.01)
*H04W 52/34* (2009.01)
*H04J 11/00* (2006.01)

(52) U.S. Cl.
CPC ........ *H04B 7/0426* (2013.01); *H04W 52/346* (2013.01); *H04W 52/365* (2013.01); *H04J 11/00* (2013.01)

(58) Field of Classification Search
CPC .. H04B 7/0426; H04W 52/322; H04W 52/34; H04W 52/346; H04W 52/365; H04W 52/367

See application file for complete search history.

(56) References Cited

U.S. PATENT DOCUMENTS

| | | | |
|---|---|---|---|
| 2008/0057871 A1* | 3/2008 | Ozluturk | H04B 7/026 455/63.4 |
| 2011/0105173 A1 | 5/2011 | Haim et al. | |
| 2013/0121203 A1 | 5/2013 | Jung et al. | |
| 2013/0279617 A1* | 10/2013 | Xu | H04B 7/0613 375/267 |
| 2015/0072719 A1* | 3/2015 | Kano | H04B 7/0626 455/522 |
| 2016/0330698 A1 | 11/2016 | Loehr et al. | |

* cited by examiner

*Primary Examiner* — Tuan Pham

(57) ABSTRACT

A method of controlling a system for transmitting data. The method includes transmitting data using a plurality of transmit paths, receiving at the access node a transmit power and an available transmit power of a wireless device, monitoring at the access node the received transmit power and the received available transmit power over a period of time, determining at the access node the received transmit power meets a first criteria and the received available transmit power meets a second criteria, and reducing transmit paths from the access node in response to determining the received transmit power meets the first criteria and the received available transmit power meets the second criteria.

20 Claims, 7 Drawing Sheets

OPTIMIZING LTE TRANSMIT DIVERSITY IMPLEMENTATION BASED ON WIRELESS DEVICE TRANSMIT POWER AND POWER HEADROOM

TECHNICAL BACKGROUND

As wireless networks evolve, the demand for high-quality service to a growing number of wireless devices or users increases. Multiple input multiple output (MIMO) is a transmission mode that has been developed to help meet this demand. MIMO is a method for increasing the data throughputs and reliability of a transmission using multiple transmitting and receiving antennas by exploiting multipath propagation. The method includes sending more than one data signal simultaneously using the same resource from multiple antennas of an access node and a wireless device receiving the data signal with multiple antennas. While MIMO increases the data throughputs and reliability of signal transmission to wireless device, it also increases the power consumption of wireless device when sending and receiving data. Power consumption of the wireless device increases since the wireless device needs to receive and decode the signal on multiple paths. Accordingly, wireless device batteries drain faster when communicating via high order MIMO transmissions as compared to low order MIMO transmissions.

Overview

Embodiments described herein include methods and systems for reducing power consumption of a wireless device by controlling a node to reduce a number of transmit paths to the wireless device based on a reported average wireless device transmit power and power headroom. An embodiment of the following description includes a method of controlling an access node. The method includes transmitting data using a plurality of transmit paths, receiving at the access node a transmit power and an available transmit power of a wireless device, monitoring at the access node the received transmit power and the received available transmit power over a period of time, determining at the access node the received transmit power meets a first criteria and the received available transmit power meets a second criteria, and reducing transmit paths from the access node in response to determining the received transmit power meets the first criteria and the received available transmit power meets the second criteria.

Another embodiment of the following description includes a system for transmitting data. The system includes a node and a processor. The processor is configured to transmit data using one or more transmit paths, monitor a received transmit power and a received available transmit power of a wireless device, determine the received transmit power meets a first criteria and the received available transmit power meets a second criteria, and reduce the transmit paths to a lower order in response to determining the received transmit power meets the first criteria and the received available transmit power meets a second criteria.

According to an embodiment, the following description includes a method of controlling a sector of a cell of an access node. The method includes transmitting data within a sector through a plurality of transmit paths, receiving at the access node transmit powers and available transmit powers of wireless devices within the sector. The method further includes determining at the access node an average of the received transmit powers and the received available transmit powers, the average of the received transmit powers meets a first criteria and the average of the received available transmit powers meets a second criteria, and reducing transmit paths from the access node in response to determining the average of the received transmit powers meets the first criteria and the average of received available transmit powers meets the second criteria.

DETAILED DESCRIPTION

According to embodiments described herein, multiple input multiple output (MIMO) wireless transmission may be optimized based on a wireless device transmit power and power headroom. Power headroom may be the difference between the current transmit power for a transmission from the wireless device and a maximum uplink transmit power. Based on the received wireless device transmit power and power headroom, an access node may determine whether the received transmit power is high and the received power headroom is low. In response to determining the transmit power is high and the received power headroom is low, the access node may reduce a number of transmit paths. For example, the number of transmit paths may be reduced from eight transmit and eight receive to four transmit and eight receive or two transmit to eight receive, or four transmit and four receive to two transmit and four receive. the transmit paths may be representative of antennas. The reduction of transmit paths may lower a power consumption and extend a battery life of wireless device.

The access node may be further controlled based on a wireless device's distance from an access node. For example, an access node may determine to maintain a number of transmit paths in response to a determination that the wireless device is disposed along a cell edge.

Figure 1:
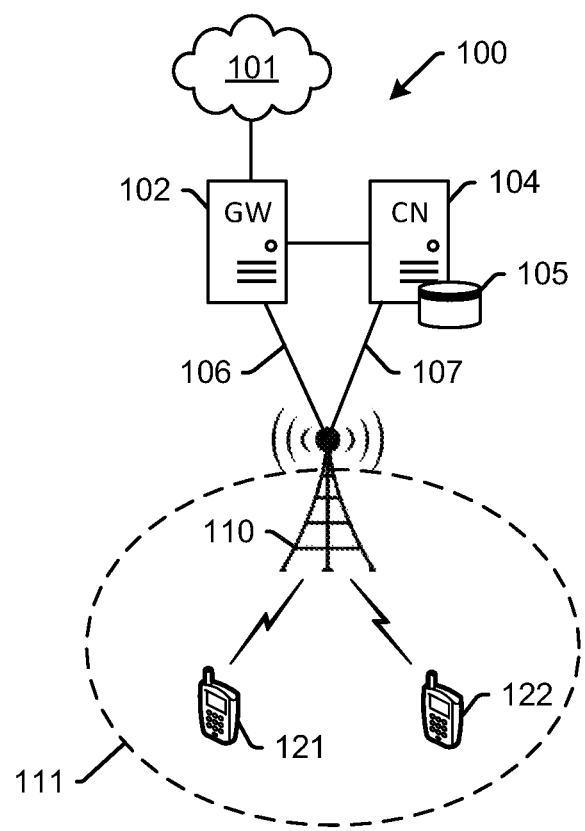
FIG. 1 is a diagram illustrating a system for controlling an access node according to an embodiment.

FIG. 1 depicts a system 100 for transmitting cell-specific reference signals. System 100 comprises a communication network 101, gateway 102, controller node 104, access node 110, and wireless devices 121, 122. Access node 110 is illustrated as having a coverage area 111, with wireless devices 121, 122 being located within coverage area 111 and accessing network services from access node 110. Access node 110 can be any network node configured to provide communication between end-user wireless devices 121, 122 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an embodiment, a macrocell access node can have a coverage area 111 in the range of approximately five kilometers to thirty-five kilometers and an output power in the tens of watts. In other embodiments, access node 110 can be a small access node including a microcell access node, a picocell access node, a femtocell access node, or the like such as a home NodeB or a home eNodeB device. The node may also include one or more remote radio heads disposed on a mast of the node and/or remote from the node. The remote radio head (RRH) may be connected to the node via a wired or wireless connection. The RRH includes one or more antennas connected to the node. By virtue of comprising a plurality of antennas as further described herein, access node 110 can deploy or implement multiple-input-multiple-output (MIMO) modes, such as transmit diversity, open loop spatial multiplexing (OL-SM), closed loop spatial multiplexing (CL-SM), and beamforming. For example, a MIMO transmission stream may be transmitted from one, two, four, six, eight, or more antennas of the node and received by one or more antennas of one or more wireless devices.

Transmit diversity mode involves the transmission of the same information stream on multiple antennas. The information stream may be coded differently on each of the antennas using space-frequency block codes (SFBC). SFBC may repeat data symbols over different subcarriers on each antenna of a node. In operation, a low signal to interference plus noise ratio (SINR) may be desired to decode the signal, however, signal quality may be more robust.

In open loop spatial multiplexing (OL-SM) mode, two information streams are transmitted over two or more antennas. There may be no explicit feedback from the wireless device, however, a transmit rank indicator (TRI) transmitted by the wireless device may be used by the base station to select the number of spatial layers.

In closed loop spatial multiplexing (CL-SM) mode, two information streams are transmitted from a plurality of antennas and a pre-coding matrix indicator (PMI) is fed back from a wireless device to a node.

In beamforming mode, an information stream is transmitted over a single spatial layer. A dedicated reference signal may be transmitted by an antenna and allows transmission from a plurality of antennas, for example two or more antennas. The signals from each antenna of the plurality of antennas may be controlled such that the net signal from the access node may be transmitted towards a wireless device as a beam formed signal. In an embodiment, the beam may be formed by weighting the magnitude and/or phase of the signals transmitted by each individual antenna. For example, the signals may be weighted such that the emitted waveform from the antennas experiences constructive interference in the direction of wireless device and destructive interference in other directions, such as, directions away from wireless device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 121, 122 may be any device, system, combination of devices, or other such communication platform capable of communicating wirelessly with access node 110 using one or more frequency bands deployed therefrom. Wireless devices 121, 122 may be, for example, a mobile phone, a wireless phone, a wireless modem, a personal digital assistant (PDA), a voice over internet protocol (VoIP) phone, a voice over packet (VOP) phone, or a soft phone, a computing platform such as a laptop, palmtop, or a tablet, relay communication device, or an internet access device, and combinations thereof. It is noted that while two wireless devices are illustrated in FIG. 1 as being in communication with the depicted access as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

In operation, access node 110 may establish communication with wireless devices 121 and 122 such that access node 110 provides the wireless devices access to a communication network (e.g., communication network 101). In an embodiment, system 100 may use a plurality of carriers in order to provide wireless communication services. For example, a plurality of carriers comprise bandwidth for wireless communications, for example, one or more carriers over a 2.5 GHz spectrum, a 1.25 GHz spectrum, a 1900 MHz spectrum, an 800 MHz spectrum, and the like. The carriers may include a plurality of channels, for example, 5 MHz channels, 10 MHz channels, 15 MHz channels, and the like, that may further be divided into subcarriers. In an embodiment, a frequency band may comprise a carrier, a channel, a subcarrier, a plurality of any of these, or any other suitable frequency band.

Communication links 106, 107 can use various communication media, such as air, space, metal, optical fiber, twisted pair cable, coaxial cable or some other signal propagation path, including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format, including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a packet data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to wireless devices 121, 122, such as control information, location, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
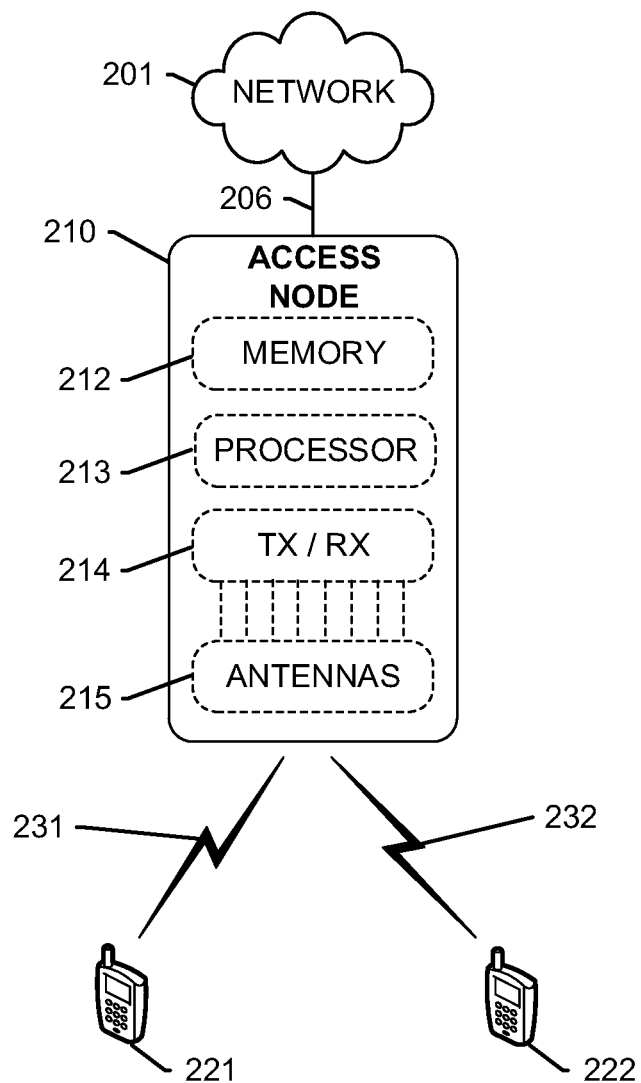
FIG. 2 is a diagram illustrating an access node according to an embodiment.

FIG. 2 depicts an example of an access node 210 for allocating resources in a wireless network. Access node 210 may be representative of access node 110 of FIG. 1, however embodiments are not limited thereto. Access node 210 is configured as an access point for providing network services from network 201 to end-user wireless devices 221, 222 via communication links 231, 232 respectively. Access node 210 is illustrated as comprising a memory 212 for storing logical modules that perform operations described herein, a processor 213 for executing the logical modules, and a transceiver 214 for transmitting and receiving signals via antennas 215. One or more antennas ports may connect the antennas 215 to the transceiver 214. Although only one transceiver is depicted in access node 210, additional transceivers may be incorporated in order to deploy MIMO modes with wireless devices 221, 222, and to facilitate communication with other network nodes on network 201. Further, access node 210 is communicatively coupled to network 201 via communication interface 206, which may be any wired or wireless link as described above.

Figure 3:
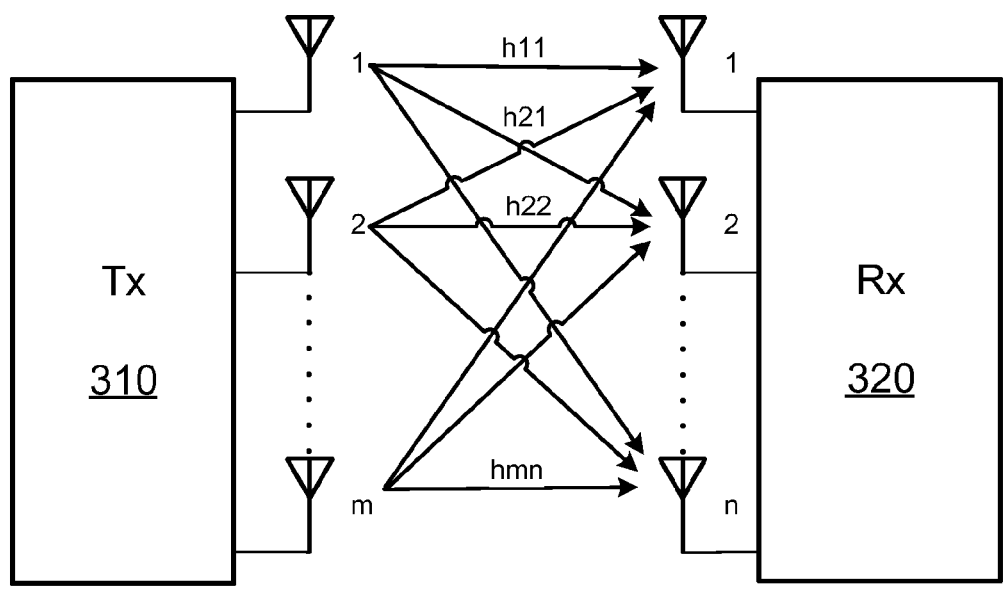
FIG. 3 is a diagram illustrating a transmitter and receiver each having a plurality of antennas according to an embodiment.

FIG. 3 depicts a schematic of a multipath signal transmitted from a transmitter 310 to a receiver 320. The transmitter 310 may be representative of the access node 110 of FIG. 1, and the receiver 320 may be representative of the wireless device 121 or a plurality of wireless devices 121, 122 of FIG. 1, however, embodiments are not limited thereto. The transmitter 310 may have a plurality of antennas. For example, the transmitter 310 may have m number of antennas. The receiver 320 may have a plurality of antennas. For example, the receiver 320 may have n number of antennas. Signal paths may be formed by the antennas for transmitting signals. For example, eight paths may be formed by eight antennas of the node transmitting a signal within the 2.5 Ghz spectrum received by eight antennas of the receiver (8T8R). According another embodiment, eight paths may be formed by eight antennas transmitting a signal within the 2.5 Ghz spectrum to 4 antennas of the receiver (8T4R). In another embodiment, four paths may be formed by four antennas of the node transmitting a signal within the 1900 MHz spectrum received by four antennas of the receiver (4T4R). In another embodiment, two paths may be formed by two antennas of the node transmitting a signal within the 800 MHz spectrum received by four antennas of the receiver (2T4R). Moreover, it is noted that while access node 110 is illustrated in FIG. 1, any number of access nodes can be implemented within system 100.

Figure 4:
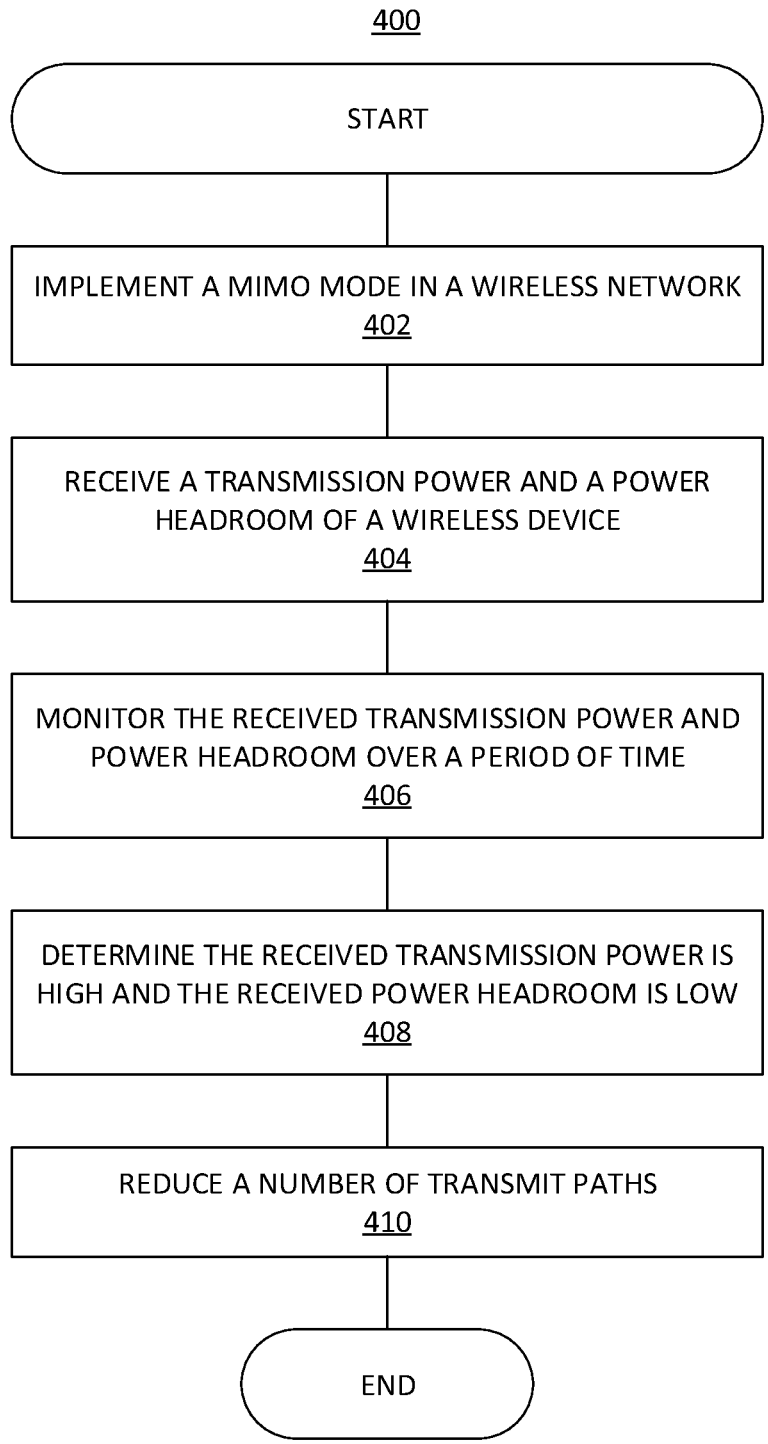
FIG. 4 is a diagram illustrating a method for controlling an access node based on wireless device transmit power and power headroom according to an embodiment.

FIG. 4 depicts an embodiment of a method 400 for controlling an access node based on wireless device transmit power and power headroom. According to an embodiment, the method 400 may include dynamically changing transmit paths of a cell or a site based on an average wireless device transmit power and power headroom. The method 400 may further include dynamically changing the transmit paths on a given sector of a cell. A sector may be a portion of a cell, and one or more node antennas may provide one or more transmit paths, respectively, for wireless device within the given sector or cell.

In operation 402 of method 400, the access node may implement a MIMO mode in a wireless network. For example, transmit diversity, open loop spatial multiplexing (OL-SM), closed loop spatial multiplexing (CL-SM), or beamforming using 8T8R or 4T4R transmit paths, as examples only.

In operation 404, the access node may receive a transmit power and a power headroom of a wireless device, or wireless device. A power headroom may be the difference between the transmit power of a wireless device and the maximum transmit power of the wireless device. The power headroom may represent the amount of available transmit power of a wireless device to increase transmit power. As an example, if the available transmit power is positive, then the wireless device may be able to send a signal with a higher transmit power. If the available transmit power is zero or negative, then the wireless device may be already transmitting at a maximum transmit power.

As an example, the access node may receive the transmit power and the available transmit power from a received power headroom report. In an embodiment, the power headroom report may comprise a value that corresponds to a power level difference between a current transmit power for the wireless device and the maximum transmit power for the device, measured in dB. As an example, the maximum uplink transmit power for wireless device may be established by a network administrator, a standard used for communications (e.g. LTE), or a local regulation, or any combination thereof, however, embodiments are not limited thereto.

In operation 406, the access node may monitor the received transmit power and available transmit power over a period of time. As an example, the access node may determine an average of the received transmit power and the received available transmit power over a period of time set by a network operator.

In operation 408, based on the averages of the received transmit power and received available transmit power, the access node may determine whether the wireless device's transmit power meets a first criteria and the available transmit power meets a second criteria. As an example, the access node determines the transmit power meets the first criteria if the average received transmit power is high, and the available transmit power meets the second criteria if the average received available transmit power is low. The first and second criteria may be based on a plurality of wireless devices, for example.

In operation 410, the access node may reduce the number of transmit paths in response to a determination that the average received transmit power meets the first criteria and the average available transmit power meets the second criteria. As an example, access node may change the transmit paths to a lower order, such as from 8 transmit 8 receive (8T8R) to 4T8R or to 2T4R, or from 4T4R to 2T4R. By reducing the number of paths, a power consumption of a user device, such as a smart phone, may be reduced and the amount of interference in a select sector may also be reduced.

Figure 5:
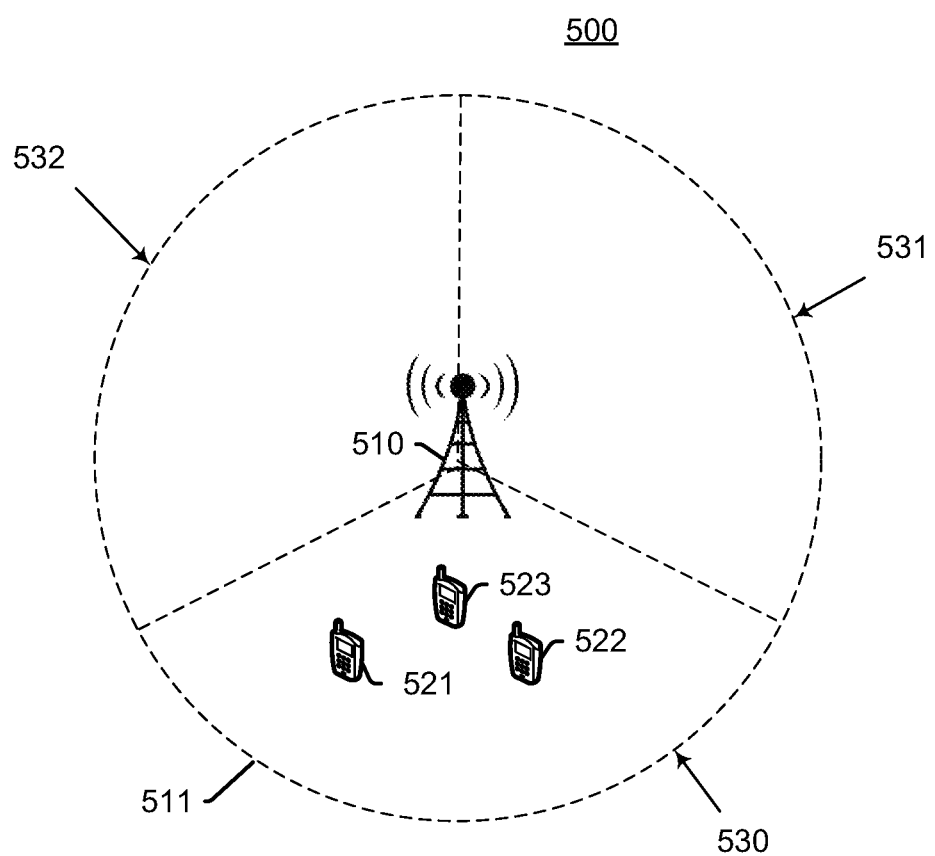
FIG. 5 is a diagram illustrating a cell of an access node having a plurality of sectors according to an embodiment.

FIG. 5 depicts a schematic of a wireless networked including a cell 500 having a coverage area generated by an access node 510. Access node 510 may be representative of access node 110 of FIG. 1 and access node 210 of FIG. 2, however, embodiments are not limited thereto. The cell 500 is divided into sectors 530, 531, and 532. While FIG. 5 depicts only three sectors, embodiments are not limited thereto. For example, the cell 500 may have less than three sectors or more than three sectors. A plurality of wireless devices 521, 522, and 523 may be disposed within sector 530. While FIG. 5 depicts only three wireless devices, embodiments are not limited thereto. For example, the cell 500 may have less than three wireless devices or more than three wireless devices located in sectors 530, 531, or 532, or any combination thereof.

Figure 6:
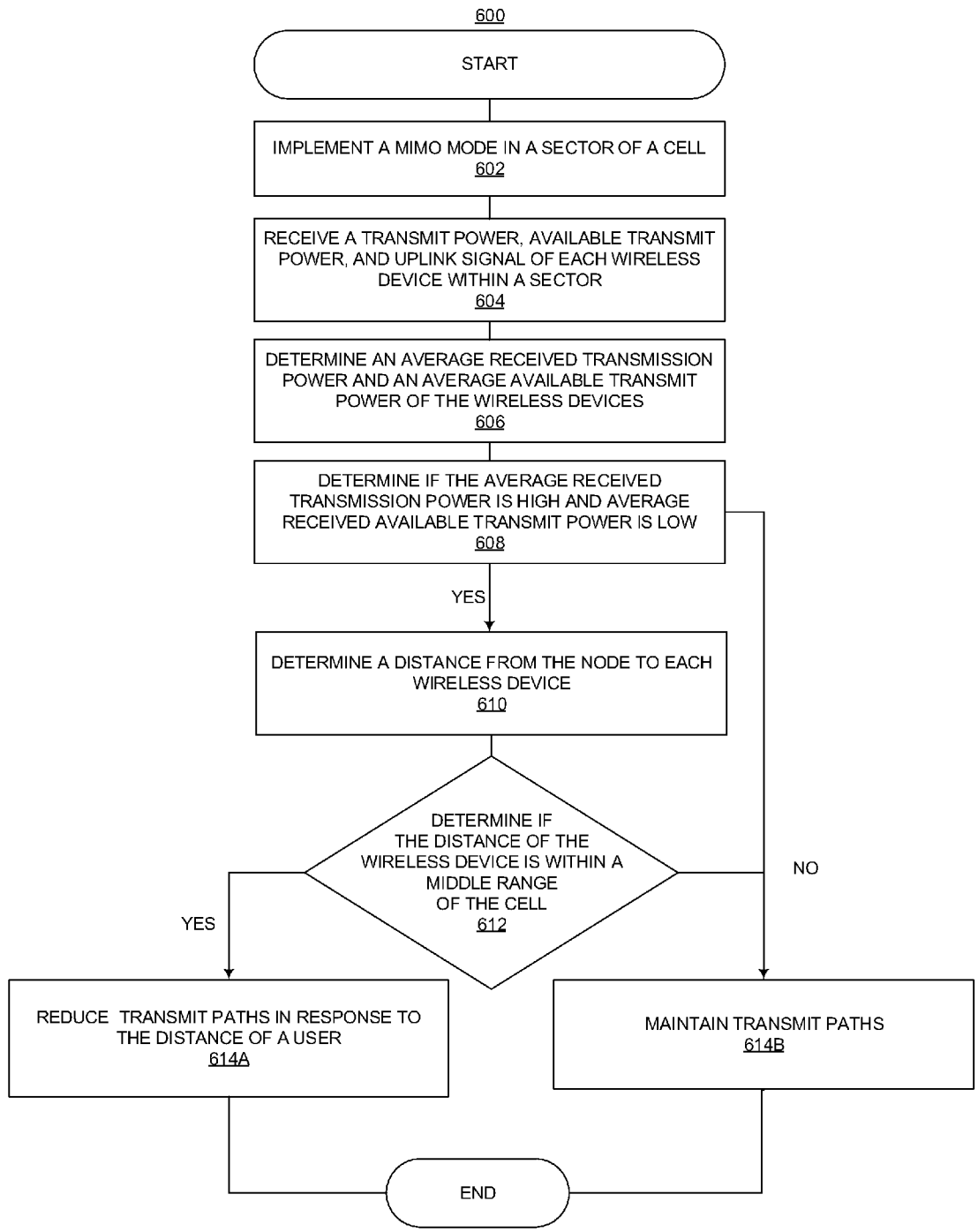
FIG. 6 is a diagram illustrating a method for controlling a sector of a cell of an access node based on wireless device transmit power, power headroom, and distances of wireless devices from the node according to an embodiment.

FIG. 6 depicts an embodiment of a method 600 for controlling an access node based on an average transmit power, power headroom, and distance from the node of each wireless device of a plurality of wireless devices. For example, the access node and wireless device may be representative of the access node 110 and wireless devices 121 and 122 of FIG. 1, access node 210 and wireless devices of 231 and 232 of FIG. 2 or access node 510 and wireless devices 521-523 of FIG. 5, however, embodiments are not limited thereto.

According to an embodiment, the method 600 may include dynamically changing transmit paths on a select sector of a cell, or a site, based on an average wireless device transmit power and available transmit power. The access node may also change the transmit paths for a sector based on a determined distance, or range of one or more wireless devices from an access node.

For example, the node may determine a select sector of a cell includes a plurality of wireless devices. The node receives from each wireless device a transmit power, an available transmit power and uplink signal. The node determines an average transmit power and available transmit power of the plurality of wireless devices. The node may also determine a distance of each wireless device from the node. In response to the average transmit power being high, the average available transmit power being low and the average distance between the wireless device and node being within a middle range of the cell, the node may reduce the number of transmit paths from 8T8R to 4T4R or 2T4R, or from 4T4R to 2T4R.

In operation 602 of method 600, the access node may implement a MIMO mode in a sector of a cell of a wireless network. For example, the node may be transmitting through eight transmit paths to one or more wireless devices within a select sector.

In operation 604, the access node may receive transmit powers, an available transmit powers, and an uplink signal from a plurality of wireless devices. As an example, the access node may receive the transmit powers and the available transmit powers from received power headroom reports transmitted in an uplink signal from the plurality of wireless devices.

In operation 606, the access node may determine an average of the received transmit powers and available transmit powers for a select sector. As an example, the access node may also determine an average of the received transmit power and available transmit power over a period of time set by a network operator.

In operation 608, based on the determined average received transmit power and the determined average received available transmit power, the access node may determine whether the wireless devices' average transmit power meets a first criteria and average available power meets a second criteria. As an example, the access node determines the transmit power is meets a first criteria if the average received transmit power is high and the average received available transmit power meets a second criteria if the average received available transmit power is low. The first and second criteria may be based on each wireless device, for example. As an example, the transmit power and the available transmit power of each wireless device may be normalized with respect to each wireless device's specifications. For example, the transmit power and available transmit power may be normalized into percentages of maximum transmit power of the wireless device. In this case, a wireless device may communicate a transmit power of 90% of maximum transmit power and an available transmit power of 10% of maximum transmit power, for example only. If the average received transmission power is high and the average received available transmission is low, the method continues to operation 610. If the average received transmission power is low and the average received available transmission is high, the method continues of operation 614B.

In operation 610, the access node may determine a distance from the node of each wireless device. The access node may determine the distance of each wireless device from an uplink signal from each wireless device. As an example, the access node may determine the distance of the wireless device from a transmission angle or timing advance of the uplink signal.

In operation 612, the access node may determine if a wireless device meets a distance criteria. As an example, the distance criteria may be a distance within a middle range of a node's coverage area, away from the cell edge.

In operation 614A, the access node may reduce the number of transmit paths in response to a determination that the wireless device meets the distance criteria. As an example, access node may change the transmit paths to a lower order, such as from 8 transmit 8 receive (8T8R) to 4T8R or to 2T8R, or from 4T4R to 2T4R. By reducing the number of paths, signal interference and power consumption of the wireless devices, such as smart phones, may be reduced.

In operation 614B, the access node may maintain transmit paths in response to the wireless device not meeting the distance threshold. As an example, the access node may determine the wireless devices are not within a middle range of a coverage area of the node, but instead beyond the middle range of the coverage area of the node, near the cell edge.

Figure 7:
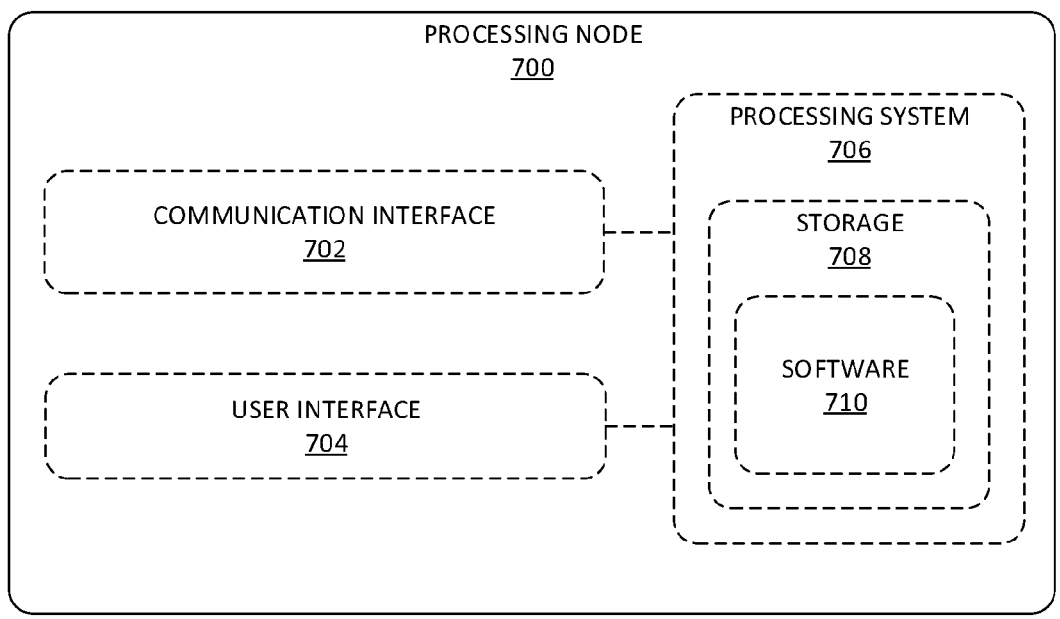
FIG. 7 is a diagram illustrating a processing node for optimizing an LTE transmit diversity implementation in a wireless network according to an embodiment.

FIG. 7 depicts an embodiment of a processing node for data transmission using frame reconfiguration comprising a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a coherence determination module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The example systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmit paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of controlling an access node, the method comprising:
   transmitting data using a plurality of transmit paths;
   receiving at the access node a transmit power and an available transmit power of a wireless device;
   monitoring at the access node the received transmit power and the received available transmit power over a period of time;
   determining at the access node the received transmit power meets a first criteria and the received available transmit power meets a second criteria; and
   reducing transmit paths from the access node in response to determining the received transmit power meets the first criteria and the received available transmit power meets the second criteria.

2. The method of claim 1, wherein the method further comprises:

determining a distance of the wireless device from the node; and reducing the transmit paths from the access node in further response to the distance meeting a distance criteria.

3. The method of claim 2, wherein the distance criteria comprises:
a middle transmission range of the access node, away from the cell edge.

4. The method of claim 1, wherein the reducing comprises changing the transmit paths from eight paths to four paths.

5. The method of claim 1, wherein the reducing comprises changing the transmit paths from four paths to two paths.

6. The method of claim 1, wherein the period of time is determined by a network operator.

7. The method of claim 1, wherein a number of transmit paths comprise transmitting data through a corresponding number of antennas.

8. A system for transmitting data comprising:
a node; and
a processor configured to:
transmit data using one or more transmit paths;
monitor a received transmit power and a received available transmit power of a wireless device;
determine the received transmit power meets a first criteria and the received available transmit power meets a second criteria; and
reduce the transmit paths to a lower order in response to determining the received transmit power meets the first criteria and the received available transmit power meets a second criteria.

9. The system of claim 8, wherein the processor is further configured to:
determine a distance of the wireless device; and
reduce the transmit paths from the node in further response to the distance meeting a distance criteria.

10. The system of claim 9, wherein the distance criteria corresponds to a middle transmit range of the access node away from the cell edge.

11. The system of claim 8, wherein reducing the transmit paths to a lower order comprises changing a number of transmit paths from eight transmit paths to four transmit paths.

12. The system of claim 8, wherein reducing the transmit paths to a lower order comprises changing a number of transmit paths from four transmit paths to two transmit paths.

13. The system of claim 8, wherein a number of transmit paths comprise a corresponding number of antennas.

14. The system of claim 8, wherein a cell of the access node is divided into sectors; and the transmit paths within a select sector are reduced.

15. A method of controlling a sector of a cell of an access node, the method comprising:
transmitting data within a sector through a plurality of transmit paths;
receiving at the access node transmit powers and available transmit powers of wireless devices within the sector;
determining at the access node an average of the received transmit powers and the received available transmit powers;
determining at the access node the average of the received transmit powers meets a first criteria and the average of the received available transmit powers meets a second criteria; and
reducing transmit paths from the access node in response to determining the average of the received transmit powers meets the first criteria and the average of received available transmit powers meets the second criteria.

16. The method of claim 15, wherein the method further comprises:
determining distances of the wireless devices from the node; and
reducing the transmit paths from the access node in further response to an average of the distances meeting a distance criteria.

17. The method of claim 16, wherein the distance criteria comprises:
a middle transmission range of the access node, away from the cell edge.

18. The method of claim 15, wherein the reducing comprises changing a number of transmit paths from eight paths to four paths.

19. The method of claim 15, wherein the reducing comprises changing a number of transmit paths from four paths to two paths.

20. The method of claim 15, wherein a number of transmit paths comprise transmitting data through a corresponding number of antennas.

* * * * *